US012589669B2

(12) United States Patent
Tsai et al.

(10) Patent No.: US 12,589,669 B2
(45) Date of Patent: Mar. 31, 2026

(54) CHARGING STATION

(71) Applicant: ADATA TECHNOLOGY CO., LTD., New Taipei City (TW)

(72) Inventors: Yu-Syuan Tsai, New Taipei City (TW); Kuo-Ting Chung, Taoyuan City (TW); Chien-Ta Tseng, Kaohsiung City (TW); Chia-Hsiang Hsiao, New Taipei City (TW)

(73) Assignee: ADATA TECHNOLOGY CO., LTD., New Taipei City (TW)

( * ) Notice: Subject to any disclaimer, the term of this patent is extended or adjusted under 35 U.S.C. 154(b) by 667 days.

(21) Appl. No.: 18/076,339

(22) Filed: Dec. 6, 2022

(65) Prior Publication Data

US 2023/0182597 A1 Jun. 15, 2023

Related U.S. Application Data

(60) Provisional application No. 63/289,642, filed on Dec. 15, 2021.

(30) Foreign Application Priority Data

Dec. 5, 2022 (TW) ................................. 111146628

(51) Int. Cl.
B60L 53/36 (2019.01)
A47L 9/28 (2006.01)
(Continued)

(52) U.S. Cl.
CPC ............. B60L 53/36 (2019.02); A47L 9/2873 (2013.01); B60L 53/305 (2019.02); B60L 53/37 (2019.02); *A47L 2201/022* (2013.01)

(58) Field of Classification Search
CPC ....................................................... B60L 53/36
(Continued)

(56) References Cited

U.S. PATENT DOCUMENTS 4,679,152 A * 7/1987 Perdue ................... B25J 19/005
318/587
5,646,494 A * 7/1997 Han ...................... H02J 7/0036
318/587
(Continued)

FOREIGN PATENT DOCUMENTS

CN 107744370 A 3/2018
CN 211266524 U 8/2020
(Continued)

*Primary Examiner* — Jerry D Robbins

(57) ABSTRACT

A charging station is adapted to charge a robot. The robot has been in communication pairing with the charging station in advance. The charging station includes a body, a charging device, a control device and an alignment device. The charging device is arranged on the body and is adapted to connect to the robot. The control device is in communication connection with the robot and is in electric connection with the charging device and is provided with a sensing unit. The control device is adapted to enable the charging device to charge the robot after the sensing unit senses the robot. The alignment device is connected to the body and is adapted to align the robot with the charging station. Whereby, the robot is charged and position deviation of the robot during charging is prevented or electric shock accidents are prevented.

6 Claims, 6 Drawing Sheets

1"

(51) Int. Cl.
  B60L 53/30          (2019.01)
  B60L 53/37          (2019.01)

(58) Field of Classification Search
  USPC .......................................................... 320/107
  See application file for complete search history.

(56)                References Cited

U.S. PATENT DOCUMENTS

| | | | | | |
|---|---|---|---|---|---|
| 10,786,129 | B1 * | 9/2020 | Ebrahimi Afrouzi | ........................ A47L 9/2873 | |
| 11,199,853 | B1 * | 12/2021 | Afrouzi | .................. B25J 13/006 | |
| 2004/0088081 | A1 * | 5/2004 | Song | ..................... A47L 9/2857 | 318/568.11 |
| 2006/0241814 | A1 * | 10/2006 | Jung | .................... G05D 1/0225 | 700/259 |
| 2007/0229031 | A1 * | 10/2007 | Song | ..................... H02J 7/0036 | 320/128 |
| 2010/0026247 | A1 * | 2/2010 | Kim | ....................... H02J 7/0036 | 320/162 |

| | | | | | |
|---|---|---|---|---|---|
| 2012/0089253 | A1 * | 4/2012 | Li | ......................... G05D 1/0234 | 901/1 |
| 2012/0143428 | A1 * | 6/2012 | Kim | ..................... G05D 1/0225 | 701/23 |
| 2013/0221908 | A1 * | 8/2013 | Tang | ...................... H02J 7/0042 | 320/107 |
| 2018/0235423 | A1 * | 8/2018 | Huang | ....................... G01S 1/16 | |
| 2019/0202064 | A1 * | 7/2019 | Wolff | .................... G05D 1/0225 | |
| 2019/0231160 | A1 * | 8/2019 | Lu | ........................ A47L 11/4011 | |
| 2020/0093342 | A1 * | 3/2020 | Jeong | ................. A47L 11/4005 | |
| 2020/0121148 | A1 * | 4/2020 | Hoffman | ............... H02J 7/0045 | |
| 2020/0154963 | A1 * | 5/2020 | Kuhe | ..................... A47L 11/33 | |
| 2020/0205630 | A1 * | 7/2020 | Mai | ........................ H02J 7/0044 | |
| 2021/0083494 | A1 * | 3/2021 | Towner | ................... B60L 53/35 | |
| 2022/0015594 | A1 * | 1/2022 | Conrad | ..................... A47L 9/12 | |
| 2022/0047138 | A1 * | 2/2022 | Wong | ................. G05D 1/0244 | |
| 2022/0247241 | A1 * | 8/2022 | Robert | ................... B60L 53/38 | |

FOREIGN PATENT DOCUMENTS

| | | |
|---|---|---|
| CN | 112220412 A | 1/2021 |
| CN | 113297871 A | 8/2021 |
| TW | I675528 B | 10/2019 |

* cited by examiner

1

CHARGING STATION

FIELD OF THE INVENTION

The present invention relates to a charging station, and particularly relates to a charging station applied to a robot.

BACKGROUND OF THE INVENTION

Cleaning an environment by means of a cleaning robot is one of the common cleaning means at present. At present, most cleaning robots are driven by batteries inside. In terms of charging, although most existing cleaning robots have the function of automatically returning to a robot charging station, there are differences in specific details during docking.

For the charging station, in order to actuate the charging function normally, it is required to protect a charging terminal between the charging station and the robot, prevent staff from electric shock as they contact the charging terminal mistakenly, and ensure that the robot and the charging station dock in a correct position or at a correct angle.

SUMMARY OF THE INVENTION

The present invention provides a charging station used for a robot to charge and capable of preventing electric shock and ensuring that the robot and the charging station can be docked at a correct position.

In order to achieve the above advantages, an embodiment of the present invention provides a charging station adapted to charge a robot. The robot has been in communication pairing with the charging station in advance. The charging station includes a body, a charging device, a control device and an alignment device. The charging device is arranged on the body and is adapted to connect to the robot. The control device is in communication connection to the robot and is in electric connection with the charging device and is provided with a sensing unit. The control device is adapted to enable the charging device to charge the robot after the sensing unit senses the robot. The alignment device is connected to the body and is adapted to align the robot with the charging station.

In an embodiment of the present invention, the alignment device is provided with a first alignment unit and a second alignment unit. An initial position guiding is performed on the robot by means of the first alignment unit and a precise position guiding is then performed on the robot by means of the second alignment unit.

In an embodiment of the present invention, the first alignment unit is an alignment pattern for the robot to identify the position of the charging station. The alignment pattern is arranged on the body.

In an embodiment of the present invention, the second alignment unit includes a guide bar extending towards a direction away from the body. The guide bar is adapted to guide the position of the robot by contacting the robot when the robot is connected to the charging station.

In an embodiment of the present invention, the second alignment unit includes optical radar.

In an embodiment of the present invention, the charging station is adapted to connect to the robot along a docking direction. The charging station further includes a protective piece. The protective piece is adapted to be affected by a third party device to actuate when the second alignment unit is docked with the robot along the combination direction. The third party device is adapted to connect to the second alignment unit, and the protective piece and the second alignment unit jointly form an alignment and protection device.

In an embodiment of the present invention, the second alignment unit is a reception channel, located on one side of the charging device, entering the body along a direction parallel to the combination direction and forming an opening in the body. The protective piece is movably connected to the reception channel and is adapted to transform between a closed position where the protective piece covers the opening and the charging device at the same time and an open position where the protective piece enters the reception channel without covering the charging device. When the protective piece is located in the open position, the reception channel receives a part of the robot as well.

In an embodiment of the present invention, the charging station further includes a driving device and a protective piece. The protective piece is adapted to movably cover a conductive contact of the charging device, so that the robot cannot contact the conductive contact. The driving device is connected to the body and the protective piece and is adapted to drive the protective piece to move to expose the conductive contact when the control device senses the robot.

In an embodiment of the present invention, the control device is adapted to be matched with control of firmware to switch the charging device from a standby state incapable of supply power to a power supply state capable of supplying power to the robot when the robot is sensed.

According to the above description, the charging station provided by the present invention controls the charging device to supply power by means of the control device, so that the staff is prevented from electric shock even if he/she directly contacts the charging device accidentally. The charging station further aligns the robot and the charging station by means of the alignment device to avoid a dislocation problem.

DETAILED DESCRIPTION OF PREFERRED EMBODIMENTS

Figure 1:
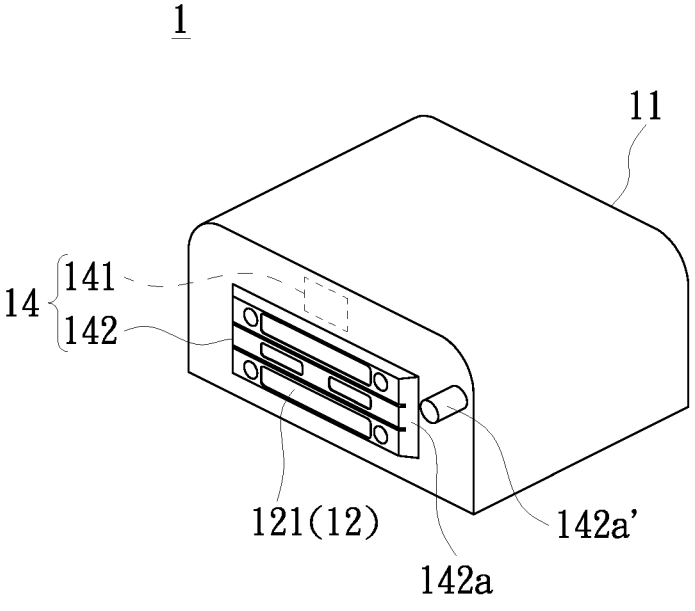
FIG. 1 is a three-dimensional schematic diagram of a charging station in an embodiment of the present invention.

Terms used in the description of the embodiments of the present invention, for example, orientation or position relation such as "above" and "below" are described according to the orientation or position relation shown in the drawings. The above terms are used for facilitating description of the present invention rather than limiting the present invention, i.e., indicating or implying that the mentioned elements have to have specific orientations and to be configured in the specific orientations. In addition, terms such as "first" and "second" involved in the description or claims are merely used for naming the elements or distinguishing different embodiments or ranges rather than limiting the upper limit or lower limit of the quantity of the elements.

Figure 2:
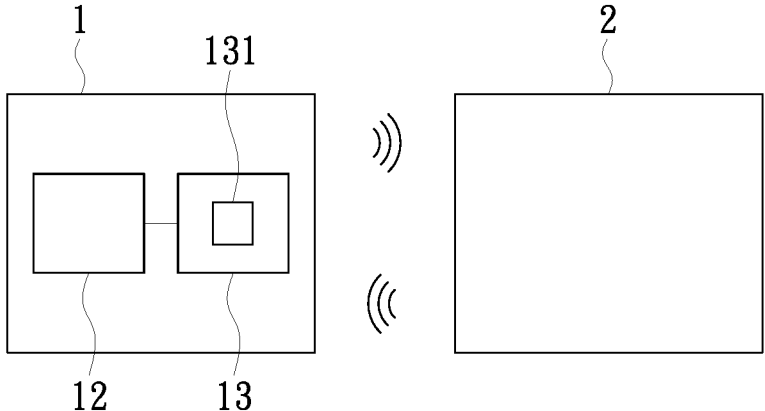
FIG. 2 shows block diagrams between the charging station and the robot in the embodiment shown in FIG. 1.
Figure 3:
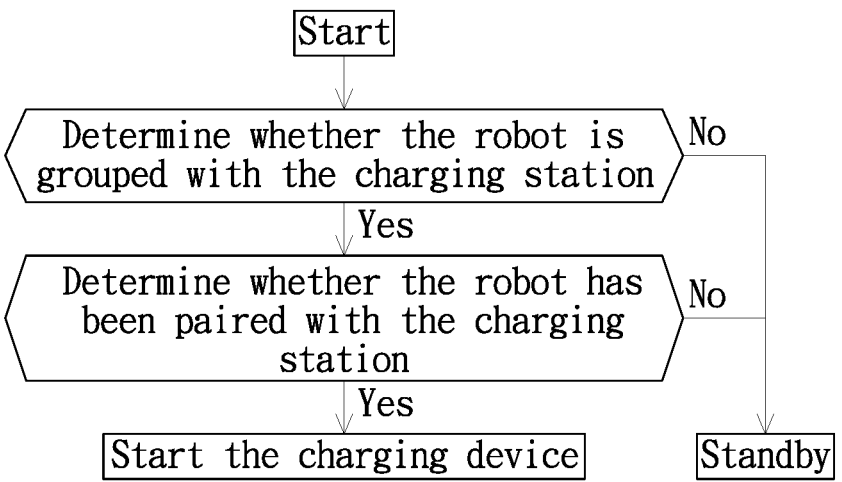
FIG. 3 is a flowchart where a control device of the charging station in the embodiment shown in FIG. 1 controls a charging device.

FIG. 1 is a three-dimensional schematic diagram of a charging station in an embodiment of the present invention. FIG. 2 shows block diagrams between the charging station and a robot in the embodiment shown in FIG. 1. FIG. 3 is a flowchart where a control device of the charging station in the embodiment shown in FIG. 1 controls a charging device. Referring to FIG. 1 to FIG. 3, the charging station 1 in the embodiment is adapted to charge a robot 2, where the robot 2 has been in communication pairing with the charging station 1 in advance. The charging station 1 includes a body 11, a charging device 12, a control device 13 and an alignment device 14. The charging device 12 is arranged in the body 11 and has a conductive contact 121 adapted to connect to the robot 2. The control device 13 is arranged in the body 11 and includes a sensing unit 131 for sensing the robot 2. The control device 13 is electrically connected to the charging device 12, and is adapted to control the charging device 12 to charge the robot 2 after sensing the robot 2. The alignment device 14 is arranged in the body 11 and is adapted to align the robot 2 with the charging station 1.

In the embodiment, for example, the body 11 can be an object connected to an external power supply (not shown in the drawings), but its shape is not limited. For example, the alignment device 14 can include a first alignment unit 141 and a second alignment unit 142, and the structure of the second alignment unit 142 is different from that of the first alignment unit 141. For example, the first alignment unit 141 is adapted to provide an initially position guide for the robot 2, so that the robot 2 can identify or sense the position of the charging station 1 at a certain distance. For example, the first alignment unit 141 is an alignment pattern arranged on the surface of the body 11, as shown in FIG. 1. For example, the alignment pattern can be a decorative pattern (QR code) or a stripe (bar code).

For example, the second alignment unit 142 is adapted to provide a precise position guide for the robot 2, so that the charging contact of the robot 2 can be precisely aligned with the charging device 12 of the charging station 1. As shown in FIG. 1, for example, the second alignment unit 142 is a blocky guide bar 142a arranged on the body 11 and protruding from the surface of the body 11. For example, the guide bar 142a can extend in a tapered manner towards the direction away from the body 11 to form a guide bevel. For example, the robot 2 can be provided with a groove, and the dimension and contour of the groove can correspond to a protrusion of the guide bevel of the guide bar 142a or the dimension or contour of the guide bar 142a. For example, the conductive contact 121 of the charging device 12 can be located at the front center of the guide bar 142a.

In addition, there is no limitation on the quantity and shape of the second alignment units 142. In this embodiment, for example, a guide bar 142a' different from the guide bar 142a in shape can further be arranged on the body 11. As shown in FIG. 1, for example, the guide bar 142a' is a bar body arranged on the body 11 and protruding from the surface of the body 11. In other embodiments not shown, the second alignment units 142 arranged on the body 11 can further be chutes or other known alignment structures for alignment as the elements contact one another. In addition, the second alignment unit 142 can further be aligned in a manner that the charging station 1 does not contact the robot 2. For example, the second alignment unit 142 can be an alignment device such as optical radar connected to a host computer in the robot 2 or the control device 13.

Continue the above description. Referring to FIG. 2 and FIG. 3, in this embodiment, for example, the control device 13 is adapted to control the start of the conductive contact 121 of the charging device 12. In this way, when the robot 2 and the charging station 1 dock, the charging station 1 communicates with the robot 2 first by taking the conductive contact 121 of the charging device 12 as a wire, and then confirms whether the docked robot 2 is the robot 2 that has been paired with the charging station 1 by means of communication connection. Further, there is no restriction on the type of the sensing unit 131 in the control device 13. The sensing unit 131 can be either a sensing unit for signal communication by means of contact between the robot 2 and the charging device 12 docked in the above description or a sensing unit for communication without contact between the robot 2 and the charging device 12, such as the known data read device. The data read device can be either a barcode read device for reading the decorative pattern on the robot 2 or an RFID antenna for reading an electronic volume label on the robot 2 and the like.

In this embodiment, after confirming that the robot 2 connected to the charging station 1 is the robot 2 that has been paired, the control device 13 then controls the charging device 12 to switch from the standby state incapable of supplying power to a power supply state capable of supplying power to the robot 2. Thus, even if a staff or an object touches the conductive contact 121 of the charging device 12 mistakenly, dangers such as electric shock are avoided as the staff or the object cannot communicate with the control device 13 and the charging device 12 is still kept in the standby state without forming a loop with a contactee or the contactant via the aforementioned pairing step.

Figure 4:
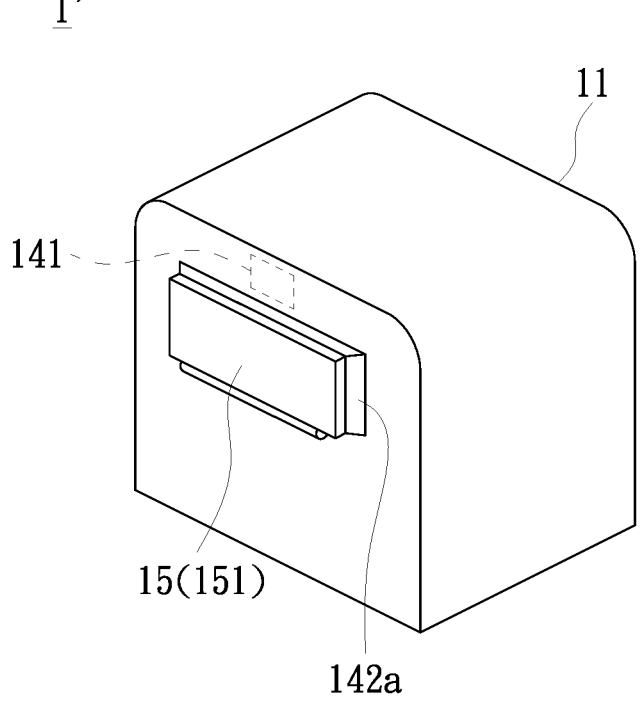
FIG. 4 is a three-dimensional schematic diagram of a charging station in another embodiment of the present invention.
Figure 5:
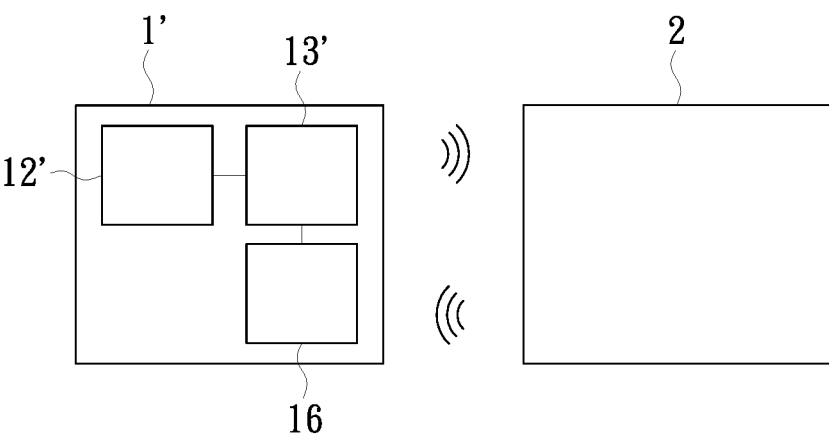
FIG. 5 shows block diagrams between the charging station and the robot shown in FIG. 4.
Figure 6:
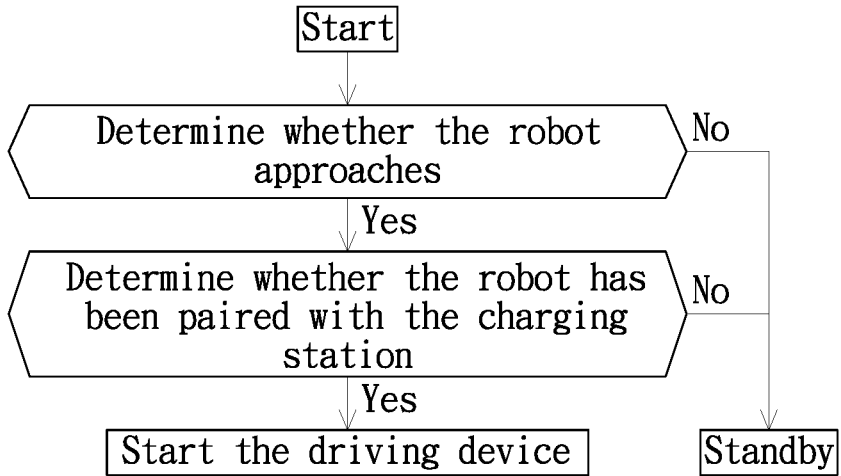
FIG. 6 is a flowchart where a control device of the charging station in the embodiment shown in FIG. 4 controls a charging device.

FIG. 4 is a three-dimensional schematic diagram of a charging station in another embodiment of the present invention. FIG. 5 shows block diagrams between the charging station and a robot in the embodiment shown in FIG. 4. FIG. 6 is a flowchart where a control device of the charging station in the embodiment shown in FIG. 4 controls a charging device. In this embodiment, the hardware design of the body 11, the charging device 12' and the alignment device can refer to the aforementioned embodiment, and no redundant detail is to be given herein. As shown in FIG. 4 and FIG. 5, the charging station 1' in this embodiment further includes a driving device 16 and a protective piece 15. For the control device 13' in the embodiment, different from the way of controlling the charging device 12 to change the start state by using firmware by the control device 13 in the embodiment in FIGS. 1-3, the control device 13' in this embodiment controls the position of the protective piece 15 by controlling the driving device 16 to decide whether the charging device 12' is docked with the robot 2. In other words, in this embodiment, the control device 13' decides whether the charging device 12 can be docked with the robot 2 by way of controlling hardware, which will be described in detail below.

As shown in FIG. 4 and FIG. 5, for example, the protective piece 15 in this embodiment is a cover plate 151 installed on the body 11. For example, the cover plate 151 is driven by the driving device 16 to deflect on the body 11 so as to be switched between the position covering the conductive contact 121 (not shown in FIG. 4 and FIG. 5, referring to FIG. 1) of the charging device 12' and the position not covering the conductive contact 121. For example, the driving device 16 is a servo motor installed on the body 11 and connected to the control device 13' and is adapted to drive the protective piece 15 (for example, the cover plate 151) to actuate.

Referring to FIG. 4 to FIG. 6, in the embodiment, when the control device 13' does not sense that the robot 2 approaches the charging station 1' (or sense a signal representing that the robot 2 is to be connected to the charging station 1'), the protective piece 15 covers the conductive contact 121 (not shown in FIG. 4 and FIG. 5, referring to FIG. 1) to prevent others or objects from contacting the conductive contact 121. When the control device 13' senses that the robot 2 approaches (or sense a signal representing that the robot 2 is to dock to the charging station 1'), the control device 13' controls the driving device 16 to drive the protective piece 15 to swing relative to the body 11, so that the cover plate 151 swings to the position not covering the conductive contact 121 from the position covering the conductive contact 121, and therefore, the robot 2 approaching the charging station 1' can contact the conductive contact 121 for charging.

Figure 7A:
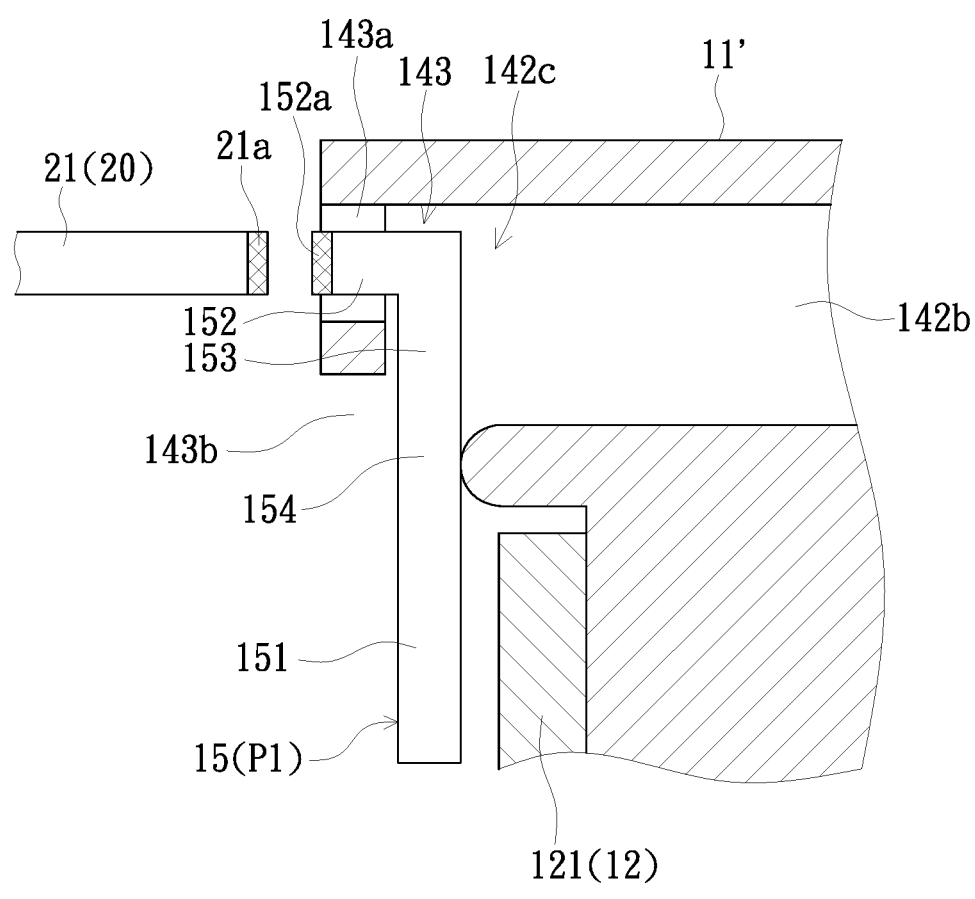
FIG. 7A is a schematic diagram of a protective piece of the charging station in an embodiment of the present invention in a closed position.
Figure 7B:
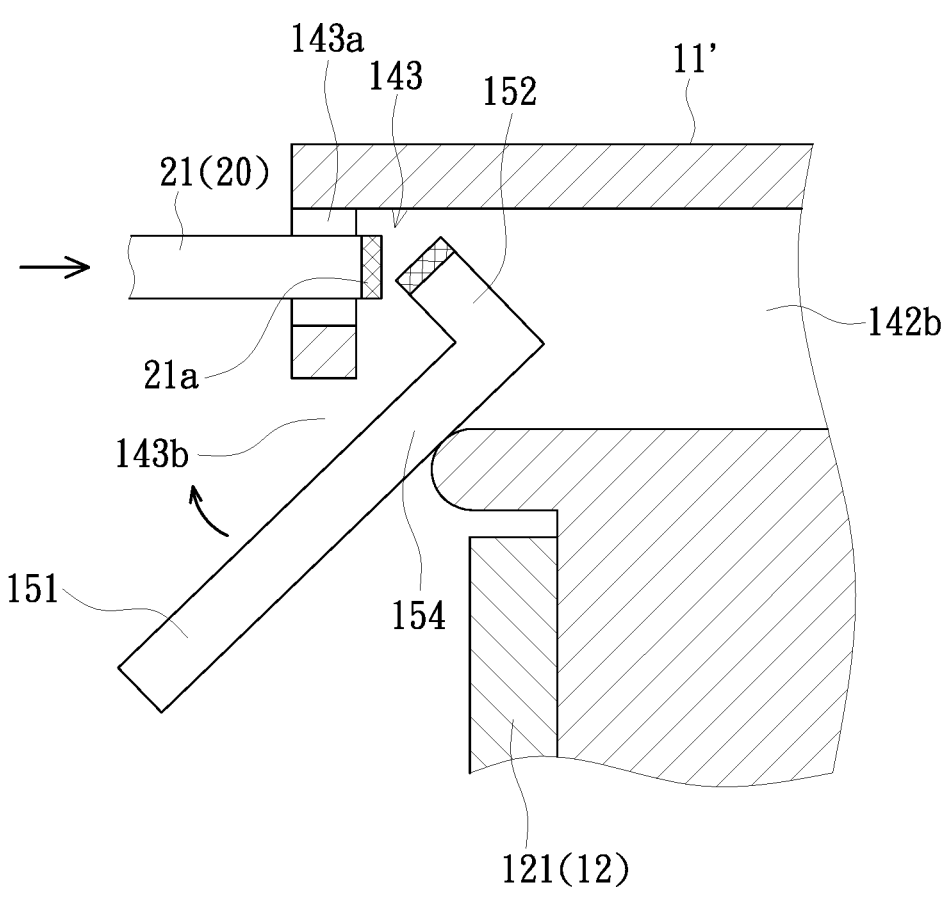
FIG. 7B is an actuating schematic diagram of the protective piece in the embodiment shown in FIG. 7A.
Figure 7C:
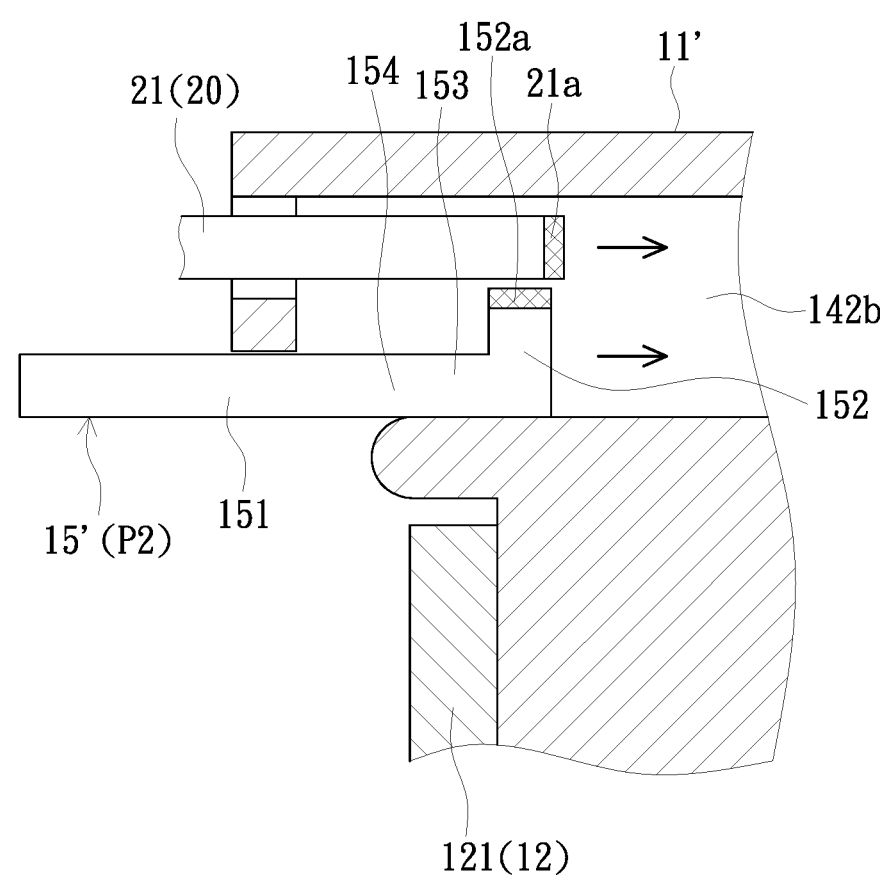
FIG. 7C is a schematic diagram of the protective piece in the embodiment shown in FIG. 7A in an open position.

FIG. 7A is a schematic diagram of a protective piece of the charging station in an embodiment of the present invention in a closed position. FIG. 7B is an actuating schematic diagram of the protective piece in the embodiment shown in FIG. 7A. FIG. 7C is a schematic diagram of the protective piece in the embodiment shown in FIG. 7A in an open position. Referring to FIG. 7A to FIG. 7C, in the embodiment, the alignment device 14 can further be integrated with the protective piece 15, which is described in detail below.

In this embodiment, the robot 2 (shown in FIG. 2 or FIG. 5) has a push rod 21 as a third party device 20, and a magnet 21a is arranged at one end of the push rod 21. The charging station 1" includes a reception channel 142b as a second reception device 142. For example, the reception channel 142b is arranged on the body 11' and is located on one side of the charging device 12 (e.g., above the conductive contact 121 in FIG. 7A). The reception channel 142b extends into the body 11' along the docking direction when the charging station 1" and the robot 2 are docked and forms an opening 142c in the body 11'. As shown in FIG. 7A, for example, the reception channel 142b in the embodiment is provided with a reception portion 143 at the end close to the opening 142c, wherein the reception portion 143 is adapted to allow the protective piece 15' to swing. The reception portion 143 has a main opening 143a and a secondary opening 143b. The opening direction of the main opening 143a extends along the opening direction of the opening 142c. The opening direction of the secondary opening 143b extends along a direction facing the charging device 12. The protective piece 15' is movably connected to the reception channel 142b and is adapted to transform between the closed position P1 where the protective piece 15' covers the main opening 143a and the charging device 12 at the same time and the open position P2 where the protective piece 15' enters the reception channel 142b without covering the charging device 12.

In this embodiment, the protective piece 15 has the cover plate 151 adapted to cover the conductive contact 121, a first pushing portion 152 located at an edge of one side of the cover plate 151 and protruding from the surface of the cover plate 151, a limiting portion 153 located between the first pushing portion 152 and the cover plate 151 and a second pushing portion 154 located between the limiting portion

153 and the cover plate 151 and facing the surface of the other side of the body 11'. The first pushing portion 152 is provided with a magnet 152a towards a direction facing the surface of one side of the body 11'. As shown in FIG. 7A, when the protective piece 15 is located in the closed position P1, the first pushing portion 152 of the protective piece 15 closes the main opening 143a, and the magnet 152a is located in the extension direction of the main opening 143a. The cover plate 151 of the protective piece 15 extends out of the reception channel 142b via the secondary opening 143b to further cover the conductive contact 121. The second pushing portion 154 pushes the wall surface of one side of the opening 142c and the limiting portion 153 pushes the wall surface between the main opening 143a and the secondary opening 143b.

Referring to FIG. 7B and FIG. 7C, by means of the above structure, when the robot 2 (shown in FIG. 2 or FIG. 5) is docked to the charging station 1", the push rod 21 enters the reception channel 142b from the main opening 143a and pushes the first pushing portion 152. As shown in FIG. 7B, as the second pushing portion 154 of the protective piece 15 is pushed by the wall surface of one side of the opening 142c, the protective piece 15 swings along with the movement of the push rod 21 and moves into the reception channel 142b, and the protective piece 15 is away from the position capable of covering the conductive contact 121. Finally, as shown in FIG. 7C, the push rod 21 enters the reception channel 142b from the main opening 143a and drives the protective piece 15 to jointly enter the reception channel 142b by means of attraction between the magnets 21a and 152a, and to expose the conductive contact 121, so that the robot 2 can contact the conductive contact 121 to charge. Eventually, when the robot 2 leaves the charging station 1", the protective piece 15 is driven by attraction between the magnet 21a on the push rod 21 and the magnet 152a on the first pushing portion 152, so that the cover plate 151 of the protective piece 15 can be separated from the reception channel 142b along with an original path and cover the conductive contact 121 again, so as to prevent others or objects from contacting the conductive contact 121.

It can be known from the above description and FIG. 7C that in the process that the protective piece 15 moves to the open position P2 via the push rod 21, the reception channel 142b as the second alignment unit 142 can receive the push rod 21 as the third party device 20 on the robot 2, so that the robot 2 and the charging station 1" are aligned. In other words, in the embodiment, the protective piece 15 and the alignment device 14 are integrated to form the alignment and protection structure between the charging station 1" and the robot 2.

In addition, types (the reception channel 142b and the push rod 21) of the above-mentioned second alignment unit 142 and the third party device 20 are only illustrated. In other embodiments, two objects can be aligned based on what is known, and the elements of mechanisms that drive the protective piece 15 to link in the alignment process as the above-mentioned second alignment unit 142 and the third alignment device 20 can be selected as required. For example, in an embodiment, the second alignment unit 142 is arranged as the guide bar. The guide bar is provided with a magnetically controlled switch (as the third party device 20) in a loop capable of moving the protective piece 15. The robot 2 is provided with the groove which is internally provided with the magnet. The magnetically controlled switch is adapted to such a structure that the magnetically controlled switch is affected by the magnet after the groove and the guide bar are grouped, so that the loop capable of moving the protective piece 15 can operate.

It can be known from the above description that the charging station provided by the present invention controls the charging device to supply power by means of the control device, so that the staff is prevented from electric shock even if he/she directly contacts the charging device accidentally. The charging station further aligns the robot and the charging station by means of the alignment device to avoid a dislocation problem.

What is claimed is:

1. A charging station, adapted to charge a robot, wherein the robot has been in communication pairing with the charging station in advance, the charging station comprises:

a body;

a charging device, arranged on the body and adapted to be connected to the robot;

a control device, in communication connection with the robot and in electric connection with the charging device and comprising a sensing unit, wherein the control device is adapted to enable the charging device to charge the robot after the sensing unit senses the robot; and an alignment device, connected to the body and adapted to align the robot with the charging station;

wherein the alignment device is provided with a first alignment unit and a second alignment unit, an initial position guiding is performed on the robot by means of the first alignment unit and then a precise position guiding is performed on the robot by means of the second alignment unit;

wherein the charging station is adapted to connect to the robot along a combination direction, the charging station further comprises a protective piece, the protective piece is adapted to be affected by a third party device to be actuated when the second alignment unit is combined with the robot along the combination direction, the third party device is adapted to connect to the second alignment unit, and the protective piece and the second alignment unit jointly form an alignment and protection device;

wherein the second alignment unit is a reception channel, located on one side of the charging device, entering the body along a direction parallel to the combination direction and forming an opening in the body, the protective piece is movably connected to the reception channel and transforms between a closed position where the protective piece covers the opening and the charging device at a same time and an open position where the protective piece enters the reception channel without covering the charging device, and the reception channel receives a part of the robot as well when the protective piece is located at the open position.

2. The charging station according to claim 1, wherein the first alignment unit is an alignment pattern for the robot to identify the position of the charging station, and the alignment pattern is arranged on the body.

3. The charging station according to claim 1, wherein the second alignment unit comprises a guide bar extending towards a direction away from the body, and the guide bar is adapted to guide the position of the robot by contacting the robot when the robot is connected to the charging station.

4. The charging station according to claim 1, wherein the second alignment unit comprises optical radar.

5. The charging station according to claim 1, further comprising a driving device, wherein the protective piece is adapted to movably cover a conductive contact of the charging device, so that the robot cannot contact the conductive contact, the driving device is connected to the body and the protective piece and is adapted to drive the protective piece to move to expose the conductive contact when the control device senses the robot.

6. The charging station according to claim 1, wherein the control device is adapted to be matched with control of firmware to switch the charging device from a standby state incapable of supplying power to a power supply state capable of supplying power to the robot when the robot is sensed.

* * * * *